United States Patent [19]
Gorenflo et al.

[11] Patent Number: 6,119,071
[45] Date of Patent: *Sep. 12, 2000

[54] EDGE EFFECT COMPENSATING BAR CODE READER

[75] Inventors: Ronald L. Gorenflo, London; Thomas M. Dolash, Worthington; John J. Garvey, Reynoldsburg, all of Ohio

[73] Assignee: Battelle Memorial Institute, Columbus, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/883,909

[22] Filed: Jun. 27, 1997

Related U.S. Application Data

[60] Provisional application No. 60/020,509, Jun. 28, 1996.

[51] Int. Cl.$^7$ ................................. G06T 1/00; G06T 7/60; H03M 1/10
[52] U.S. Cl. ..................... 702/85; 250/473.1; 250/483.1; 250/492.1; 382/173; 382/190; 235/375; 235/462; 235/468
[58] Field of Search ........................ 364/571.07; 235/375, 235/435, 454, 456, 462, 463, 468, 470; 250/483.1, 484.2, 472.1, 473.1, 492.1; 382/100, 101, 102, 155, 156, 173, 181, 190; 702/85

[56] References Cited

U.S. PATENT DOCUMENTS

| | | | |
|---|---|---|---|
| 4,642,526 | 2/1987 | Hopkins | 315/244 |
| 4,662,745 | 5/1987 | Zupanick et al. | 356/243 |
| 4,983,817 | 1/1991 | Dolash et al. | 235/462 |
| 4,995,198 | 2/1991 | Zupanick | 51/319 |
| 5,093,147 | 3/1992 | Andrus et al. | 427/7 |
| 5,294,783 | 3/1994 | Hammond et al. . | |
| 5,302,813 | 4/1994 | Goren . | |
| 5,304,786 | 4/1994 | Pavlidis et al. . | |
| 5,311,001 | 5/1994 | Joseph et al. . | |
| 5,331,140 | 7/1994 | Stephany | 235/462 |
| 5,369,260 | 11/1994 | Schuessler . | |
| 5,380,992 | 1/1995 | Damen et al. | 235/462 |
| 5,414,258 | 5/1995 | Liang | 250/252.1 |
| 5,418,855 | 5/1995 | Liang et al. | 380/23 |
| 5,444,230 | 8/1995 | Baldwin et al. . | |
| 5,449,893 | 9/1995 | Bridgelall et al. . | |
| 5,477,042 | 12/1995 | Wang . | |
| 5,478,997 | 12/1995 | Bridgelall et al. . | |
| 5,502,304 | 3/1996 | Berson et al. | 250/271 |
| 5,504,315 | 4/1996 | Hardesty et al. . | |
| 5,525,798 | 6/1996 | Berson et al. | 250/271 |
| 5,542,971 | 8/1996 | Auslander et al. | 106/21 |
| 5,608,200 | 3/1997 | LeGoff et al. | 235/462 |
| 5,627,366 | 5/1997 | Katz | 250/234 |
| 5,637,853 | 6/1997 | Joseph | 235/462 |
| 5,693,693 | 12/1997 | Auslander et al. | 524/88 |
| 5,719,948 | 2/1998 | Liang . | |

FOREIGN PATENT DOCUMENTS

WO 98/00806   1/1998   WIPO .

*Primary Examiner*—Patrick Assouad
*Attorney, Agent, or Firm*—Klaus H. Wiesmann

[57] ABSTRACT

Apparatus and method for reading a luminescent bar code on a background surface whose reflectance may vary over the coded area, including a light source for providing light to scan, and to excite luminescence in the bar code or to reflect from the background surface of the coded area; a first detector responsive to reflected non-luminescent light for providing a first signal; a second detector responsive to luminescent light for providing a second signal; and memory having stored calibration indicia of reflectance and luminescence, the memory responsive to the first and second signals for providing an output signal substantially independent of background reflectance, and substantially free of bar code edge distortion.

37 Claims, 12 Drawing Sheets

EDGE EFFECT COMPENSATING BAR CODE READER

This application claims the benefits of U.S. Provisional Application No. 60/020,509 filed Jun. 28, 1996.

FIELD OF THE INVENTION

This invention relates to methods and apparatus for accurately reading luminescent bar codes that avoid bar code edge effects. The invention is typically useful with transparent or substantially transparent luminescent bar codes that are printed, or applied by other means, on backgrounds of variable reflectance in the visible or near infrared regions. The invention is especially useful with substantially transparent bar codes that encode information as a function of bar and/or space width and at high scanning speeds.

BACKGROUND OF THE INVENTION

The technology of encoding information on various articles with bar codes is well known. Traditional bar code systems rely on the reflection differences of the reading light from the black (light-absorbing) bars and the white (light-reflecting) spaces of the bar code. A typical laser bar code reader scans the beam from a helium-neon or diode laser across the bar code. Photo-detectors monitor the beam's reflectance from the bars and spaces, and the resultant electronic signals are processed and decoded.

Bar codes on mail can be used in a system for automatic sorting of mail in the postal system. For this application, ordinary bar codes would be difficult to read over dark backgrounds and could obscure underlying printed material. Luminescent bar codes may include both fluorescent and phosphorescent materials that can be formulated into relatively clear luminescent inks that do not obscure the underlying printed material on mail pieces. In many cases background obscuration is less important than the ability to read bar codes printed over backgrounds of widely varying reflectivity. In these cases luminescent bar codes may be printed using luminescent ink formulations that are more opaque.

Bar code readers require sufficient contrast between bars and spaces to permit accurate differentiation. With fluorescent bars, a major problem has been the background fluorescence of the paper in the spaces of the bar code. Various ways of compensating for differences in background fluorescence of the spaces have been devised by use of optical filters and electronic circuitry (U.S. Pat. No. 3,207,910 Hirschfeld) and development of fluorescent inks that can be activated by ultraviolet light to fluoresce at longer wavelengths (e.g. 580 nm peak) where the background fluorescence of the paper is less (U.S. Pat. No. 4,186,020, Wachtel). Methods are known to deal with the background reflectance of the paper on which a luminescent bar code is printed, which may appreciably affect the luminescent signal generated by the bar code due to the background under the bars of the bar code. This latter system is disclosed in U.S. Pat. No. 4,983,817 to Dolash et al, which is incorporated herein by reference as fully as if it were presented in complete text. In U.S. Pat. No. 5,380,992 to Damen et al there is disclosed a method and apparatus for compensating for background luminescence so that background luminescence does not affect bar code/no bar code detection decisions. The Dolash patent however does not solve a problem created by luminescent inks that, when used for bar code printing over a given background, the luminescent inks have a reflectivity at the source excitation wavelength that is measurably less than the reflectivity of the background material itself at source excitation wavelengths. In cases where for a given background, there is a difference in reflectivity of the bars printed with luminescent ink, and the reflectivity of the space between printed bars, neither Dolash et al nor Damen et al can be used to automatically compensate the luminescent bar code signals without distorting the signal at bar code edge transitions.

It is well known that material properties other than reflectivity may affect the signal levels received by the luminescent channel and reflectance channel detectors. Porous materials tend to absorb inks, while non-porous materials permit inks to puddle or stand up more on the surface. Background luminescence inherent in the substrate and inks used on the substrate will likewise affect signal levels. In applications where it is necessary to compensate for bar codes printed over a wide range of such different materials, the bar code compensation apparatus and method disclosed and claimed herein will account for this.

For successful decoding with luminescent bar codes, it is necessary that the processed signal from the code delivered to the decoder have practically constant amplitude, independent of any variations in the collected luminescent signal due to localized variations in background reflectance. Thus, means are needed for automatically compensating the total collected luminescent signal for the reflected component of the luminescent light according to the localized background and bar code surface reflectance in the area of the scanning beam. The present invention provides such means.

It is well known to use optical filters to separate light of difference frequencies. For example, in traditional bar code readers, a filter is used to block the reflected ambient light and pass only the reflected light from the bar codes. To adapt this traditional system to reading infrared luminescence, the conventional ambient-light filter is replaced by an optical filter that blocks the light of the laser and passes the luminescent light in the far-red and near-infrared range of the spectrum. The amount of excitation light to be blocked by the filter depends on the amount reflected by the background on which the luminescent bar code is printed. It is greatest for a reflective white surface and least for a dark light-absorbent surface such as black printing ink.

If, in addition to blocking the reflected excitation light in order to selectively measure luminescent light, separate means are provided to simultaneously measure the amount of reflected excitation light, a separate electrical or optical signal can be obtained that is related to the reflectance at excitation wavelengths of the bar code and the substrate over which it was printed. This signal can be used to simultaneously compensate the amplitude of the luminescent signal by appropriate electronic or optical circuitry to provide a relatively constant amplitude of the signal fed to the decoder.

The compensation method described in the Dolash Patent significantly improved the ability to detect transparent and somewhat transparent bar codes printed with luminescent materials. This type of compensation can, however, create a distorted rendition of the signal representing the bar code edges. The resulting distortion can ultimately lead to the misinterpretation of bar code widths, or in certain cases, bar codes can go undetected. There are several contributors to this potential distortion. In the case of somewhat transparent bar codes, or bar codes that are more opaque at excitation wavelengths, the reflected signal over bars is generally less than it is over spaces between bars for a given background. Thus, during the transition from bar to space, both the reflected signal amplitude and the luminescent signal amplitude change. In this case, the compensation of the Dolash patent does not produce a signal that represents a true rendition of the transition from bar to space or from space to bar.

Another source of performance degradation results when optical filters used to separate the two channels do not completely prevent reflected signal leakage in the luminescent channel (crosstalk). Since the Dolash patent relies on the luminescent signal to be near zero in bar code spaces regardless of the reflected signal, it is important that the leakage be minimal in order for the compensation scheme to maintain the widest possible dynamic range. The present invention is more tolerant of channel crosstalk, because the calibration procedure includes a measure of the phenomenon, and the compensation algorithm takes crosstalk into account.

It is common for bar codes to be printed using ink jet printers. Printed bars are formed by a series of ink dots, where the diameter of the ink dots is approximately equal to the spacing between the ink dots. For scanning bar code systems, maximum power is detected by the receiver when the receiver aperture is equal to or greater than the laser spot size. It is common practice to adjust the laser spot size equal to seven tenths of the width of the narrowest bar or space to be detected at the nominal read distance. This permits maximum signal modulation, and still compensates for some voids in the bar. Thus when the bar code scanning system is set up properly, the electrical or optical signal from the narrowest bar is in a constant state of transition. Bar code signal pulse widths are normally measured at the 50% point on the transitions. In order to maintain optimum noise margins, it is preferable that linear bar to space and space to bar transitions be maintained. The present invention will assure that the best rendering of the actual bar code that was printed will be obtained so that the binarized signal output is an accurate reproduction of the width of the bars.

The apparatus and the calibration method described in the present invention can maintain bar code edge signal transition linearity, or optionally select a nonlinear transfer function for correcting the bar code edge signal. A linear case is described in detail herein. A non linear transfer function for the bar code edge signal would be preferable in a case where bar detection is more important than being able to measure the width of the bar or bar space.

BRIEF DESCRIPTION OF THE INVENTION

Broadly the invention includes an apparatus for reading a luminescent bar code on a background surface whose reflectance may vary over the coded area, including means for providing light to scan, and to excite luminescence in the bar code or to reflect from the background surface of the coded area; means responsive to reflected non-luminescent light for providing a first signal; means responsive to luminescent light for providing a second signal; memory means having stored calibration indicia (or look-up table) of reflectance and luminescence, the memory means responsive to the first and second signals for providing a compensated output signal that is typically substantially independent of background reflectance and/or substantially free of bar code edge distortion. The apparatus may typically include means for interfacing data having the calibration indicia with the memory means and/or means for digital signal processing for providing calibration indicia for the memory means. The means for digital signal processing may include software for providing the calibration indicia such as the calibration procedure described herein using a Kriging algorithm, or neural network software. Typically the invention includes means for digital signal processing for providing calibration indicia for the memory means, wherein signals to be processed are obtained through the scanning of calibration cards with the apparatus. If desired the look-up table is configured to obtain a linearized signal of bar code edge information or a preselected nonlinear signal of bar code edge information.

Typically the calibration indicia are stored in memory as a look-up table, wherein the first and second signals are used to access the look-up table, the memory means providing an output signal in response to the first and second signals. The means for providing the first, second and output signals typically comprise digital means. In another embodiment the first, second and output signals can be optical signals or electric signals. The look-up table may be provided by neural network techniques.

Typically the means for providing the first and second electrical signals comprise photodetecting means, and the means for providing the first and second signals comprise means for separating the light into a first wavelength band corresponding to non-luminescent light and a second wavelength band corresponding to the luminescence, and optical means for collecting and focusing light in each wavelength band on separate means for providing separate output signals responsive to the light in each wavelength band. Typically the light separating means comprises light filters or a dichroic beam splitter.

In another typical embodiment of the apparatus the means for providing light to excite luminescence in the bar code comprises an ultraviolet light source that is activated briefly prior to scanning the bar code to provide phosphorescence in the material of the bars, and the means for providing light that is reflected without luminescence from the background surface during scanning of the bar code comprises a light source providing light of wavelength in the range of about 600 to 900 nanometers.

Another embodiment of the apparatus includes laser means for providing light in the near infrared region that excites a dye in the bar code to fluoresce in a band of wavelengths in the infrared region longer than the wavelength of the excitation light. Preferably the same light excites the luminescence and provides the non-luminescent light that is reflected from the background surface.

A further embodiment of the invention includes one or more calibration cards for use with the edge effect compensating bar code readers including a substrate; a plurality of light absorbing or reflective materials applied to a portion of the substrate, each of the light absorbing or reflective materials having different light absorption characteristics; and a luminescent material applied to a portion of the substrate and a portion of each of the light absorbing materials. Alternatively, the invention also includes a calibration card for use with the bar code readers having a substrate; a grey scale applied to a portion of the substrate, wherein the grey scale has increasing or decreasing light absorption characteristics from one end of the gray scale to the other; and a luminescent material applied to a portion of the substrate and to a portion of the grey scale at a plurality of areas of gradually increasing or decreasing light absorption. More specifically, the invention also includes a calibration card for use with the bar code readers in the form of a step density card including a substrate; a density wedge applied to the substrate, the density wedge comprising a plurality of light absorbing backgrounds on the substrate wherein each of the light absorbing backgrounds comprises a light absorbing material applied to the substrate, wherein the light absorbing backgrounds are placed substantially adjacent to one another and have a graduated increase in light absorption from one light absorbing background to another; at least one luminescent area on a portion of the substrate and at least one luminescent area on a portion of each of the light absorbing backgrounds, wherein the luminescent area comprises a luminescent material applied to the substrate or the light absorbing material. Typically the luminescent area comprises a luminescent bar code. Preferably the luminescent bar code has substantially the same characteristics as a luminescent bar code to be read by apparatus for reading bar codes with which the step density card is used. If desired for calibration the luminescent bar code can be partially on the light absorbing background and partially on the substrate. In further embodiments the step density wedges or grey scales may include color scales of various colors that are expected to be encountered.

A further embodiment of the invention includes a method for reading a luminescent bar code on a background surface and correcting background reflectance to obtain a signal substantially free of bar code edge signal distortion, by the steps of providing a beam of light focused to a small area and containing at least one predominant frequency band; scanning the beam across the bar code; selectively collecting reflected non-luminescent light in a first frequency band; selectively collecting light in a second frequency band predominantly resulting from luminescence of the bar code; converting the collected light in the first frequency band into a first signal responsive to the reflectance of the background surface; converting the collected light in the second frequency band into a second signal responsive to the amount of luminescent light; and providing an output signal corresponding to the first and second signals from a look-up table in memory, the output signal substantially independent of background reflectance and substantially free of bar code edge distortion. Typically the luminescent bar code contains dyes that luminesce in the far red and near infrared region and the light is provided by laser means that simultaneously stimulates luminescence while scanning the bar code to provide reflected light without luminescence responsive to the reflectance of the background surface. Preferably the luminescent bar code is substantially transparent and is applied over a visible bar code, and both bar codes are read using the same light source and using separate signal processing means for each bar code. Preferably the method uses the apparatus itself for calibration by scanning one ore more calibration cards using the apparatus for reading bar codes the apparatus having memory means for storing and accessing a look-up table, converting obtained signals into digital signals, processing the signals to provide calibration indicia for the memory means. The apparatus and method of the invention advantageously obtain an output signal substantially independent of background reflectance, and free of bar code edge distortion and reader system induced distortion.

DETAILED DESCRIPTION OF THE INVENTION AND BEST MODE

Figure 1:
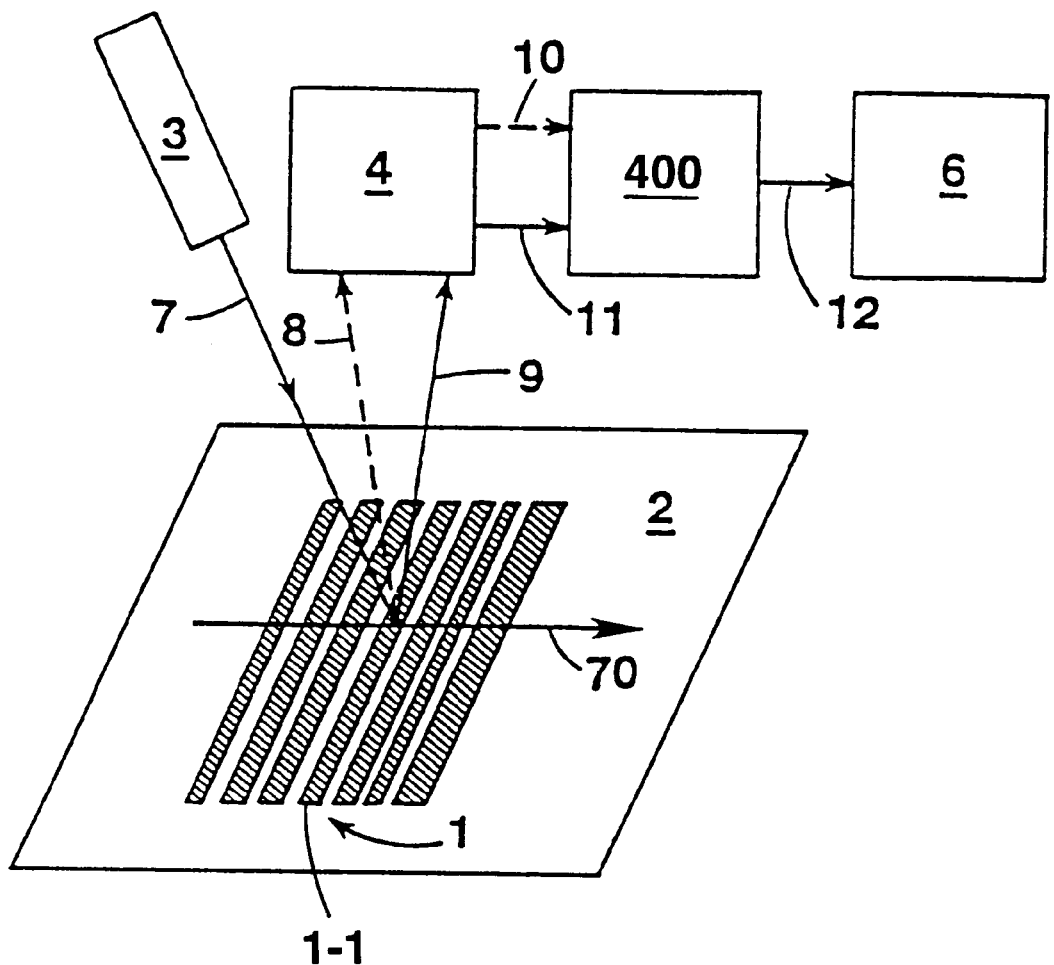
FIG. 1 is a schematic representation of a typical luminescent bar code reader according to the present invention showing the principal means comprising excitation of the luminescence, dual collection and detection of luminescent and reflected excitation light, and electronic and optical circuitry for signal processing and decoding.

This invention relates to methods and apparatus for reading luminescent bar codes that typically encode information as a function of bar width and/or space width and at high scanning speeds. The luminescent bar codes may be substantially transparent, partially transparent, or substantially opaque. The general term luminescent or luminescence as used herein includes the phenomena of fluorescence and phosphorescence. Fluorescence being luminescence having a persistence of less than about $10^{-8}$ second and phosphorescence having a persistence of longer than about $10^{-8}$ second. For purposes of the present invention, the important consideration for the luminescent activity of the bar code is that the persistence of luminescence be sufficiently short to allow reliable discrimination of the bar code information by the reading device. The persistence characteristic of the bar code can be readily adjusted by those skilled in the art by appropriate selection of luminescent materials. In a preferred embodiment the invention may employ optics arranged substantially as in U.S. Pat. No. 4,983,817 assigned to the same assignee as the present application and incorporated by reference herein. While certain wavelengths of light are used in the examples and test conditions herein the wavelengths useful with the invention are not limited thereto, but, may be any that provide fluorescence and scanning of the bar code useful for the particular combination of fluorescent inks, backgrounds and substrates used.

The invention described herein defines a digital background compensation method, apparatus, and calibration process capable of independent application or of being adapted to existing bar code readers. The invention combines a background compensation calibration technique that offers greater accuracy and more flexibility, which ultimately leads to improved bar code reading rates. The apparatus typically includes one or more look-up tables (or calibration indicia that are equivalent to a look-up table) to perform digital compensation in real time, avoiding a speed penalty for new and existing bar code readers. The invention provides for producing a signal of constant amplitude independent of background reflectance for decoding and is typically compensated for hardware effects, e.g. signal cross talk, substrate effects, e.g. direct luminescence, and bar code edge signal distortion effects. There are also disclosed flexible calibration techniques that makes it possible to calibrate bar codes printed over materials that have a wider range of luminescent ink absorbing characteristics. The method of the invention improves the rendition of the signal at edges of bar codes over the prior art by including the edge and off/on bar code data in the calibrations. This allows a more accurate determination of bar width and thus improves the accuracy of bar code readers.

Look-up tables are well known in the computer art. A look-up table as used herein includes a collection of data in a form suitable for ready reference, frequently as stored-in-sequence machine locations or written in the form of a structured format for easy entry. Typically, the intersection of labeled rows and columns serves to locate a specific piece of data or information.

Referring now to FIG. 1, typical apparatus according to the present invention for reading a luminescent bar code 1 printed on a surface of a substrate 2 which may have variable background reflectance in the code area (e.g. calibration card, magazine cover, sales tag, postal card or envelope), comprises four main components: a light source means 3 to scan the bar code 1, a dual light detection means 4, electronic or optical circuitry means comprising background and edge effect signal distortion compensator 400 that compensates for bar code signal distortions, and bar-code decoding means 6. Direction of scan is indicated by arrow 70 in FIG. 1 and FIG. 2A. The direction of scan is the same in FIGS. 2A, 2B, and 2C.

In a typical embodiment of the present invention wherein the bar code 1 comprises transparent, substantially transparent, partially transparent, substantially opaque, or even completely opaque luminescent material such as an ink, the excitation light source means 3 comprises a conventional visible laser in conjunction with a conventional decoder 6 that are both commercially available and used for conventional black on white bar code readers. Another typical embodiment of the present invention, the bar code 1 comprises transparent, substantially transparent, or partially opaque luminescent material (luminescent bar), the excitation light source means 3 comprises a 780 nm solid state laser in conjunction with a conventional decoder 6 that are both commercially available, and can be used for conventional black on white bar code readers. Dual detection means 4 and electronic or optical circuitry means 400 for background and bar code signal compensation are included also for reading bar codes that luminesce in the far red and near-infrared region of the spectrum. Memory means 420 (see FIG. 4) is provided for look-up table data for compensating for distortions inherent in the system such as substrate variances, cross talk, bar code edge effects, and other distortions encountered in bar code reading systems.

Figure 3:
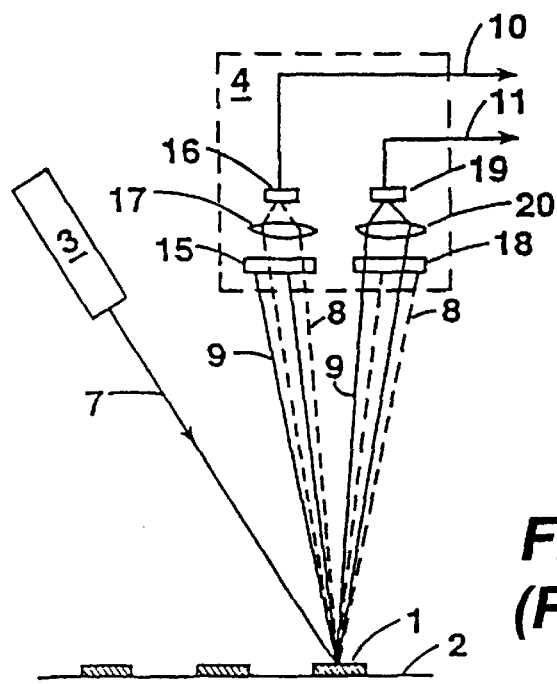
FIG. 3 is a schematic representation of typical dual detection means comprising optical filters, collection optics, and light detectors.

When the excitation light 7 from the light source 3 impinges on a luminescent bar 1—1, the dye material of the luminescent bar luminesces and emits luminescent light 8 at a wavelength longer than the wavelength of the excitation light 7. A portion of the luminescent light 8 and the reflected excitation light 9 are collected by dual detection means 4 (see also FIG. 3), which separates the light of different wavelengths and produces electrical or optical signals 10, 11 related to the intensity of the luminescent light 8 and reflected excitation light 9 respectively. The luminescent light signal 10 is compensated with the reflected excitation light signal 11 and with data stored in a look-up table or data calculated in real time by electronic or optical circuit means 400 (see FIG. 4) to produce a resultant background and bar code edge signal distortion compensated electric signal 12 which is fed to standard decoder means 6.

Figure 2A:
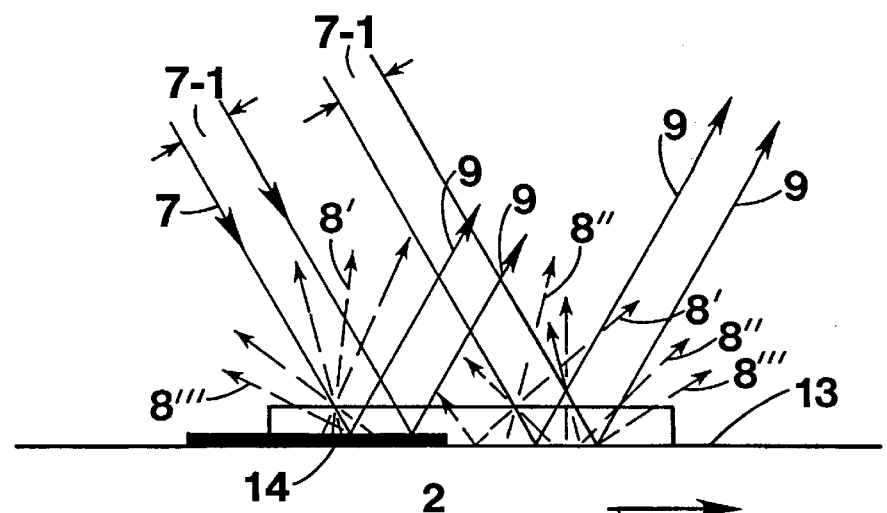
FIGS. 2A, 2B, and 2C are schematic representations of a cross-section of a luminescent bar 1—1 illustrating various positions of incident light beam 7 and the resulting luminescent light 8 (made up of luminescent beams 8', 8", and/or 8'''), and reflected light 9.
Figure 2B:
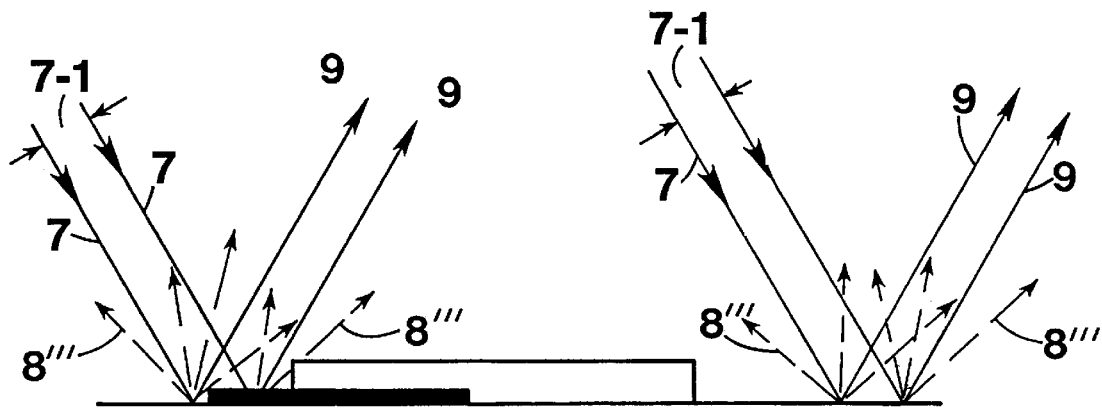
Figure 2C:
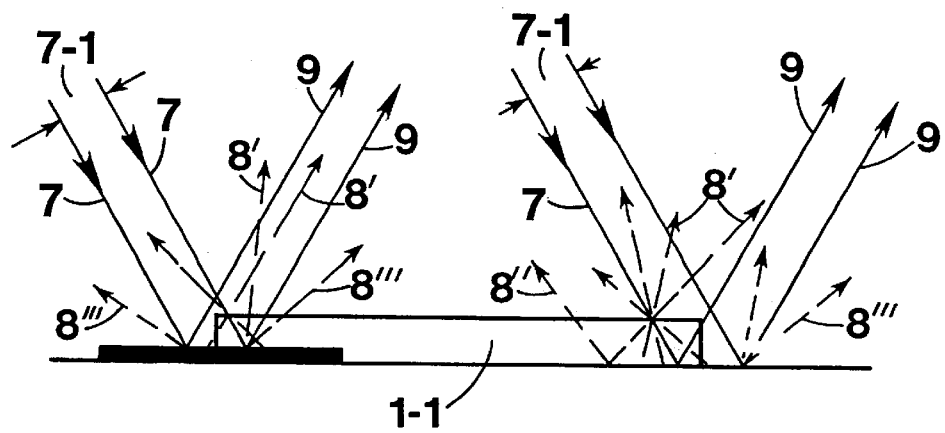

The amount of luminescent light 8 from a luminescent bar 1—1 that reaches the collection means 4 depends in part on the local reflectance of the background surface 2 and on the local reflectance of the bar code 1, as illustrated in FIGS. 2A, 2B, and 2C. For example, referring initially to FIG. 2A that shows two positions of a typical laser excitation beam 7. The excitation beam 7 normally has a beam width 7-1 and in the two beam positions shown is completely on a luminescent bar code 1—1, where one position (left) is over a low reflective surface 14 and the other position (right) is over a white or highly reflective surface 13. The direct luminescent light 8' emanating from excited luminescent dye molecules in the direction of the collection means 4 is supplemented by reflected luminescent light 8" toward the collection means 4. An additional factor might be that since more of the excitation light is reflected from the light reflective surface than from the dark surface, the dispersed luminescent dye molecules in the luminescent bar 1—1 can be exposed to greater excitation light 7, 9 (i.e. reflected plus incident). Regardless of the exact mechanism, it is observed that the total luminescent light 8 collected from identical bars varies over a wide range, depending on the reflectance of the background surface 2 under the bar. An additional component is direct background luminescence 8''' due to luminescence of the substrate and/or other background material applied over the substrate. For the situation illustrated in FIG. 2A the Dolash patent does compensate for the amount of luminescent light 8 in accordance with the reflectance of the background 2. The reflected excitation light 9 provides the suitable simultaneous signal to correct for background reflectance.

The Dolash patent, however, did not account for the fact that the excitation beam 7 has a finite beam width that imposes distortions by the compensating scheme as beam 7 transitions from background material to luminescent bar, or from luminescent bar to background material. Thus there is additionally, a need to account for bar code edge signal distortion during the transition of the beam of the excitation light 7 from the substrate 2 or background material on the substrate to the luminescent bar 1—1 and from the luminescent bar 1—1 to the substrate 2. FIG. 2B shows two beam positions where the excitation beam 7 is completely off a luminescent bar 1—1 and only on substrate 2 or background material 14, that has black or poorly reflective surface, immediately before traversing the luminescent bar (left) or after traversing the luminescent bar 1—1 (right). Direction of light beam 7 travel is to the right as shown by arrow 70 (see FIG. 2A). At this point the measured light components include: (1) luminescent light beam 8 comprising luminescent light 8''' due to direct luminescence from the substrate and/or material applied to the substrate (typically printing ink as in a magazine cover, and (2) reflected excitation light 9.

Referring now to FIG. 2C, this figure shows two beam positions either moving onto the luminescent bar 1—1 (left) or off the luminescent bar 1—1 (right). After the excitation beam 7 transitions to a position where it is partly on the substrate 2 and partly on the luminescent bar 1—1, the detected light components include: (1) luminescent light 8 comprising luminescent light 8' due to direct luminescent light from the bar 1—1, reflected luminescent light 8", background luminescent light from the substrate or background material 8'''; and (2) reflected excitation light 9. When the excitation light 7 beam is partly on and partly off the bar 1—1 reflectance and absorbance both vary during the transition. This is due mostly to the absorbance of light by the bar 1—1 to produce luminescent light and reduced reflectance. The effect of the absorbance/reflectance change due to the bar 1—1 is to create a transition zone in recognizing the bar edge that is the diameter of the light beam spot. As discussed earlier, the beam spot size is typically larger in relation to the bar 1—1 width shown in the FIGS. 2A to 2C so that the period when transitions off and on the bar 1—1 are occurring are a larger part of the total signal. Thus accurate edge renditions are very critical in making accurate bar and space width readings.

The dual detection means 4 is designed to collect and separately measure the light intensity in a first frequency band corresponding to the reflected excitation light 9 and to measure separately the light intensity in a second frequency band corresponding to the luminescent light 8. In one typical embodiment of the invention, half of the dual detection means 4 shown in FIG. 3 comprises a first optical filter 15 to block reflected excitation light 9 and to pass the luminescent light 8 (where total luminescent light 8=8'+8"+8'''), which is focused on a first detector 16 by first collection optics 17. The other half of the dual detection means 4 comprises a second optical filter 18 which blocks luminescent light 8 and passes the reflected excitation light 9, which is focused on a second detector 19 by second collection optics 20.

Other dual detector means such as the dual detector means of FIG. 13 of U.S. Pat. No. 4,983,817 that shows an alternative arrangement of the dual detection means 4' will work as well in the present invention.

Figure 4:
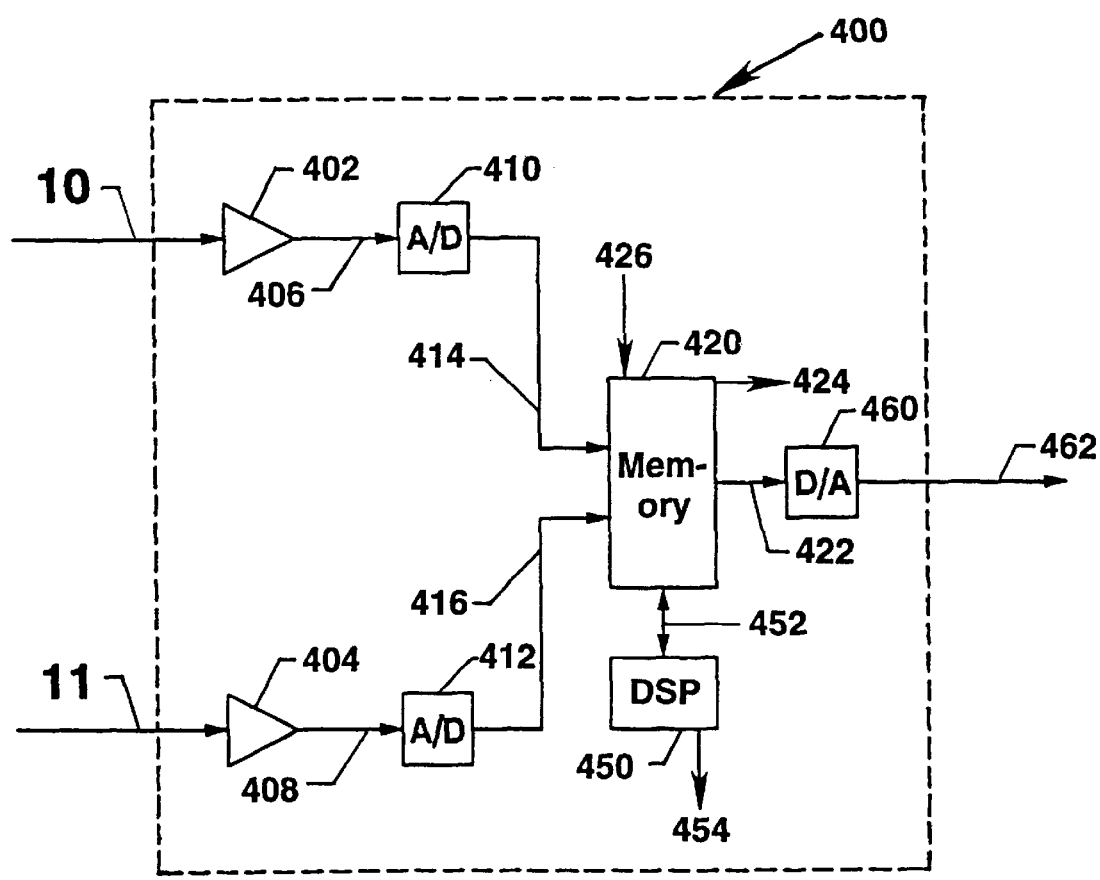
FIG. 4 is a schematic block diagram of typical circuitry for signal processing according to the present invention to produce a signal of constant amplitude independent of background reflectance for decoding and typically compensated for signal cross talk, substrate direct luminescence, and bar code edge signal distortion effects.

FIG. 4 shows a schematic block diagram of typical circuitry required to perform accurate digital background and bar code edge signal rendition on high-speed bar code signals generated by the dual detectors. The digital background compensator 400, receives luminescent and reflected bar code signals 10,11 of varying amplitude due to (1) variations in the underlying background over which the bar codes were printed, (2) variations in direct luminescence from luminescence of the substrate or ink printed on the substrate, and (3) crosstalk between the luminescent and reflected bar code signals, and other system distortions and processes them to produce an output bar code signal accurately representing bar code widths and spacing widths whereby system distortions and bar code edge effects are substantially avoided. The resulting output is provided to the bar code decoding circuitry for reading. The reflected and luminescent channels each may consist of gain, DC restoration, offset and low pass filter electronics 402,404. For each channel, the electrical signal of the electronics 402,404 is provided to a high-speed analog to digital converter (ADC) 410,412.

The resultant digital bar code signals 414,416 of each analog to digital converter 410,412 are provided to a memory 420. The memory 420 is designed to process the two digital bar code signals 414,416 in conjunction with a look-up table in memory 420. The resultant compensated binary bar code output has been substantially compensated for the amplitude variation in the luminescent bar code signal due to variations in the background underlying the printed bars and for distortions of the signal at bar code edge transitions that occur because of the compensation for amplitude variation of the luminescent bar code. This is accomplished in the following way. With a look-up table in memory the input signal is used to access the corresponding output that relates to the incoming R and F values of signals 414,416. The output of the memory 420 is typically in the form of a binary signal 422 or 424 either a binary digital bar, no bar signal, or optionally the output can be a digital gray scale signal that can be provided to a digital to analog converter for the purposes of constructing a compensated analog bar code. In the first case (binary digital), the digital output is generated by using the digital background compensator algorithm and then thresholding all data so that all values lying below the 50% (or other selected point) of the bar code edges results in a zero output, while all values that are above the 50% (or other selected point) of the bar code edges result in a maximum output (or binary 1). Digital to analog converter 460 is used to feed an analog signal 462 to a decoder 6 (see FIG. 1) or the binary signal 424 can be used directly. The calibration interface 452 is used for entering calibration data to memory 420 either from the CPU of some other device such as a personal computer. Other inputs to memory 420 may be made via other input 426. If desired external control signals may be used to control the digital signal processor via line 454.

The digital background compensator 400 can be implemented in a variety of ways. In a preferred embodiment, the digital background compensator 400 has a random access memory 420 that is configured as a look-up table. The look-up table data consist of predetermined output values for each of the possible combinations of input values from the luminescence and reflectance digital channels. The look-up table data are created during a calibration process, and can be stored in a separate non-volatile memory for retrieval between calibrations, or the look-up table memory itself can be a non-volatile memory. Using the look-up table approach, the luminescence and reflectance channel signal inputs can generate compensated outputs in real time with minimal processing latency. The digital background compensator 400 can also be implemented using a digital signal-processing computer 450 that runs the compensation algorithm in real time. For maximum flexibility and performance, the digital background compensator 400 typically includes a look-up table memory processor 420 and a digital signal processing computer (or a CPU) 450 that can be used to perform calibrations as required.

Figure 8:
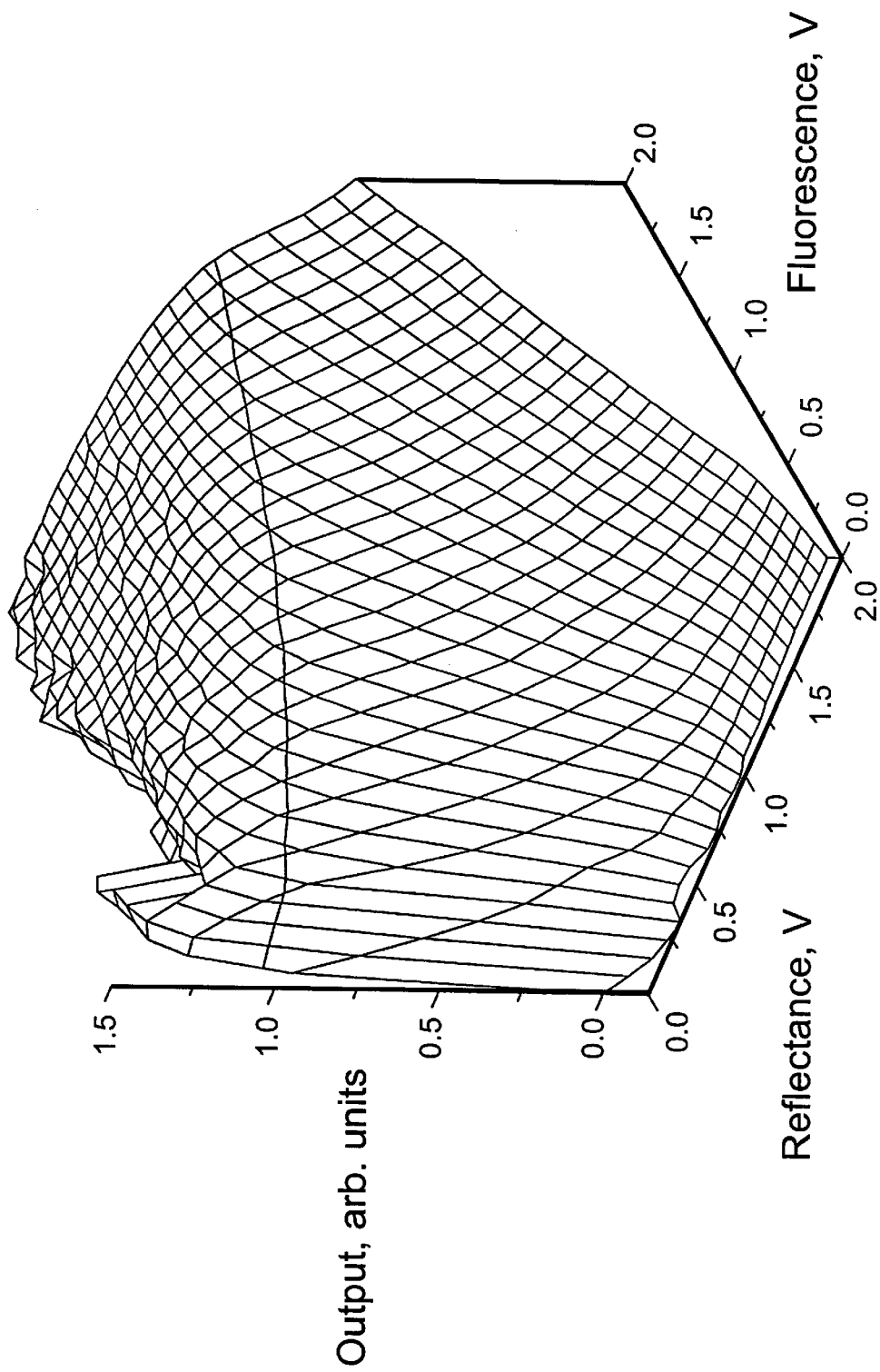
FIG. 8 shows a three-dimensional plot of the results from applying a kriging algorithm to data obtained from FIG. 7. The left hand horizontal axis shows reflectance in volts, the right hand horizontal axis shows fluorescence in volts, and the vertical axis shows output in arbitrary units. This figure represents the look-up table in memory. The R and F value from a point under the surface which is projected up points to an output value on the surface shown.

Digital background compensator 400 calibration is accomplished by measuring the luminescence and reflectance signals from a luminescent material such as ink applied at a luminescent area to a substrate having a first light absorbent background as well as the luminescence and reflectance signals from the same substrate and light absorbing background when no luminescent ink is present. These measurements are repeated for as many variations in substrate, luminescent area, and light absorbing background as is desired or practical. The on-bar and off-bar calibration provides adequate data to create a uniform amplitude compensated bar code signal output without distorting the signal at the edge transitions from bar to no-bar, and from no-bar to bar, even if there is some channel cross-talk, and if the bar code ink is somewhat opaque at the excitation wavelength. For a given background, the normalized output of the digital background compensator 400 should be one (1) for the luminescence and reflectance values measured over the luminescent ink, while the normalized output should be zero (0) for the values measured when no luminescent ink is present. Output values between zero and one should represent a linear measure of the percentage of the laser beam spot that is incident on the ink. The desired output of the digital background compensator 400 can be viewed as the height of a surface above a luminescence-reflectance plane as shown in FIG. 8.

Since it is not practical to measure the values for every possible variation in light absorption or reflectance for a substrate or other light absorbing background, a curve fit is often used to connect the luminescence, reflectance points for the measured on-bar data, and another curve fit for the measured off-bar data. In practice, second-order polynomial curve fits appear to be suitable, although higher order curve fits can be used if desired or needed in a particular case. The output surface may then be constructed from the measured and interpolated data.

EXAMPLE CALIBRATION

Figure 5:
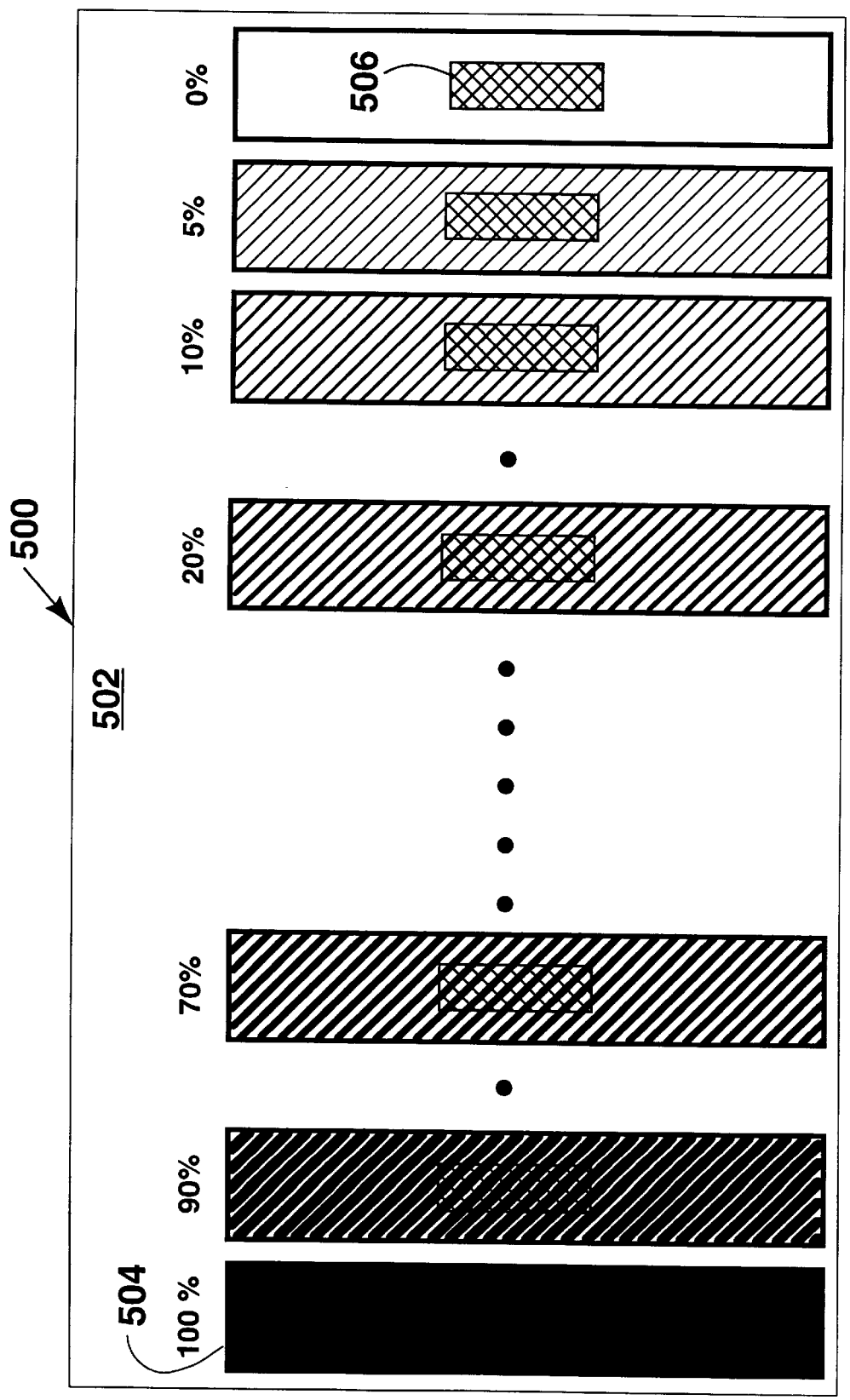
FIG. 5 is one embodiment of a density wedge over which luminescent material has been applied with one luminescent material applied to the substrate surface directly.

Consider the following example for purposes of demonstrating typical calibration and operation of the digital background compensator 400 configured as shown in FIG. 4. Referring now to FIG. 5, a typical calibration card 500 is provided with a substrate 502 having one or more light absorbing backgrounds 504, and two or more areas having luminescent material 506, wherein each light absorbing background 504 has at least one portion having luminescent material 506 thereon and the substrate has at least one portion with luminescent material 506 thereon. At least two luminescent areas 506 can be satisfied by one luminescent area 506 that is partially on a light absorbing background 504 and partly on the substrate 502. Each light absorbing background is typically composed of ink of selected light absorbance, preferably increasing or decreasing in a particular direction in a stepwise manner. Thus in FIG. 5, steps of light absorbance from substantially 0% absorbance (very light substrate only) with no light absorbing ink to substantially 100% absorbance are provided. In FIG. 5, 100% represents the maximum light absorbance of the applied ink and 0% represents the minimum light absorbance of the light absorbing areas since it is for the substrate only.

Figure 6:
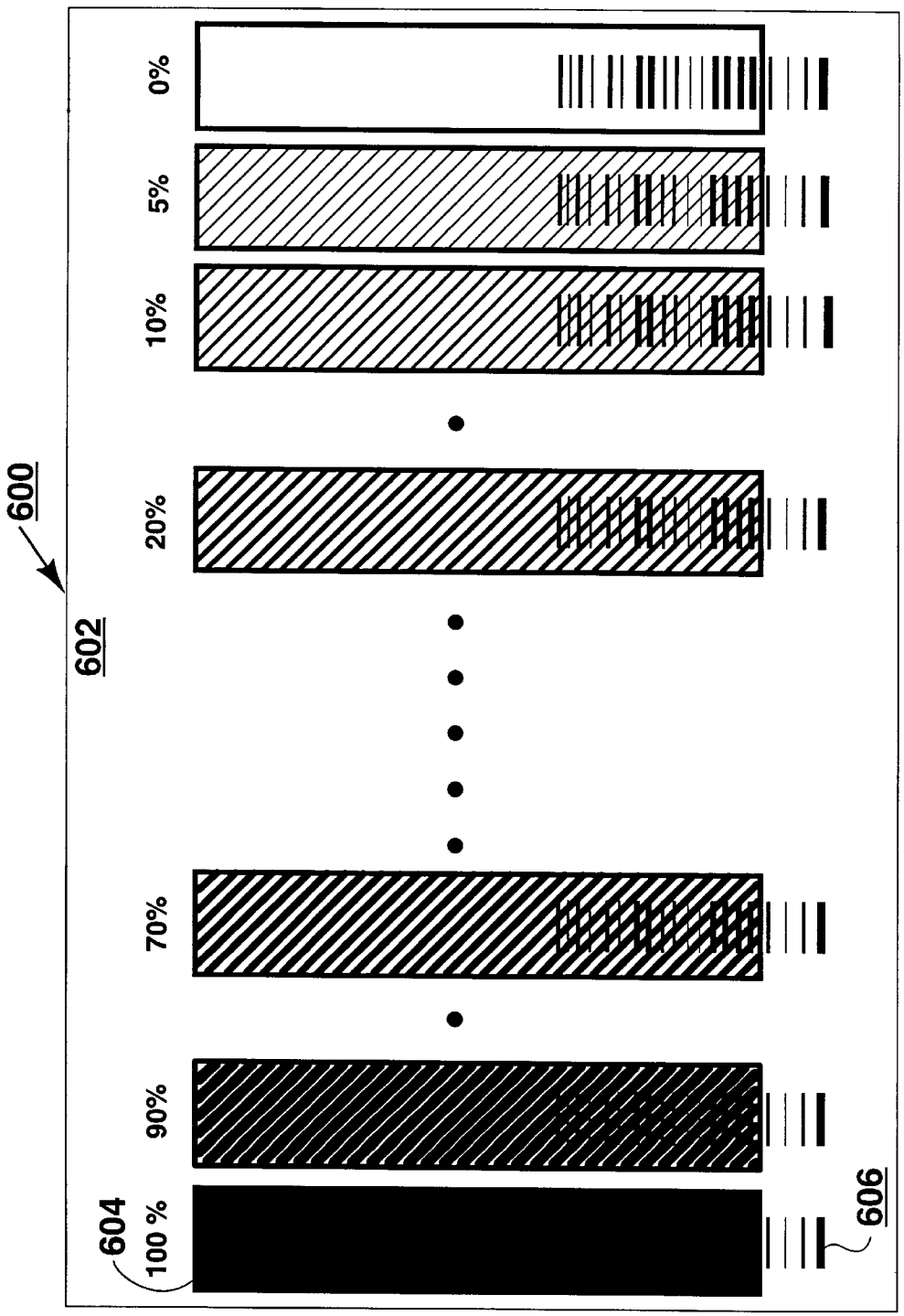
FIG. 6 is a 14-step density wedge over which luminescent ISIF bar codes are printed partially on and partially off of each step of the density wedge.
Figure 7:
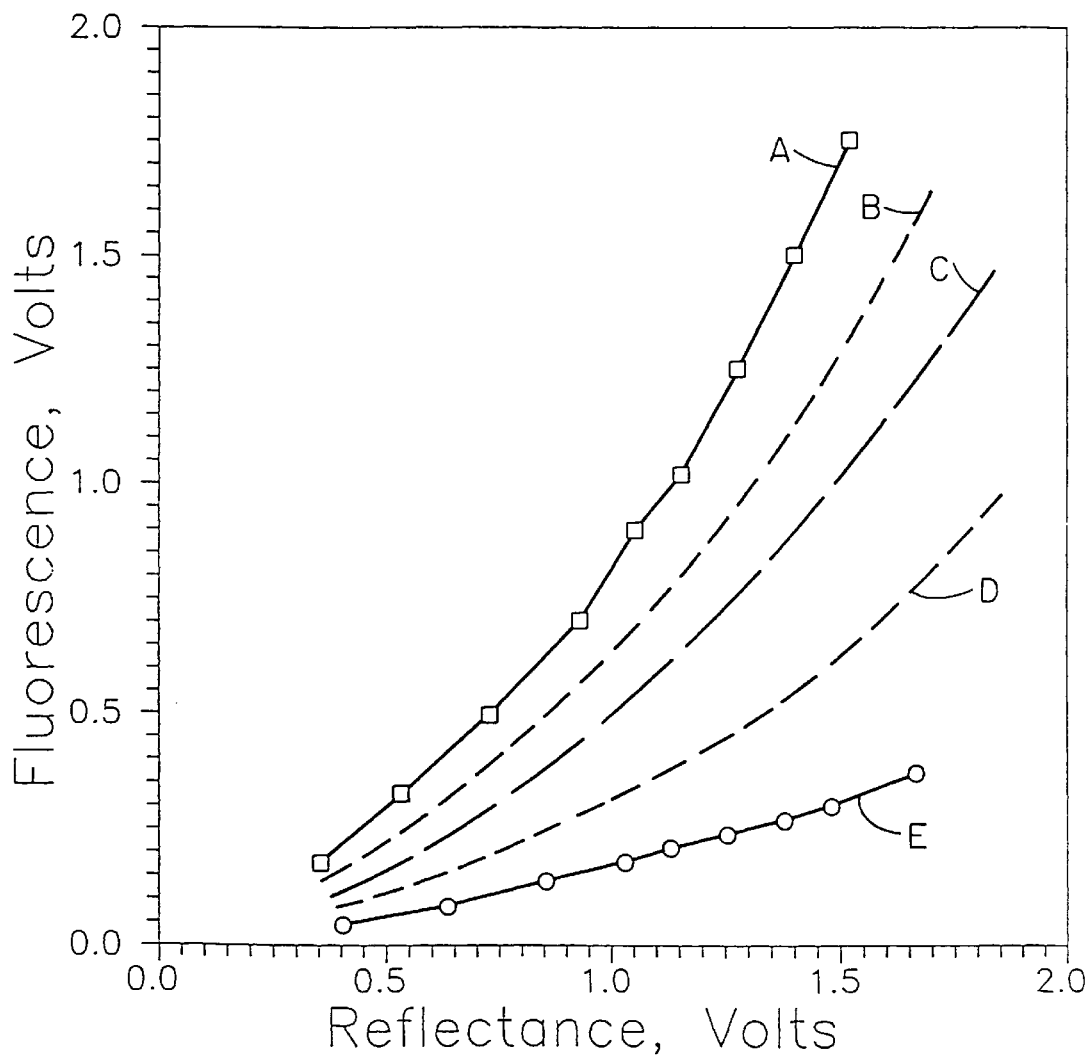
FIG. 7 is a plot of data for reflectance (R) horizontal axis, and luminescence (F) vertical axis, acquired over bars of luminescent ink that have been applied over a light absorbent background material and over a substrate background with no light absorbent material applied for a density wedge such as that illustrated in FIG. 6. Curve A is plotted from data obtained from readings over a bar 1—1 while curve E is obtained from data from readings completely off a bar. Curves B, C, and D are obtained by interpolation between curves A and E to obtain values for light beam 7 positions 75%, 50%, and 25% off/on a bar 1—1.

Referring now to FIG. 6, in another embodiment, a step density wedge calibration card 600 has luminescent ink bar codes 606 that are printed partly on and partly off (on the substrate 602) each of the light absorbent background steps 504 of a step density wedge. As each of the bar codes is scanned, sufficient data is collected to determine the average signal value over the printed bars for the luminescent channel and the reflectance channel. Also, for each of the bar codes scanned, sufficient data is collected to determine the average value between printed bars for the luminescent channel and the reflectance channel. Thus, reflectance (R) and luminescence (in this particular example fluorescence) (F) data are acquired over bars of luminescent ink and over backgrounds with no luminescent ink. A plot of such data is shown in FIG. 7. The curves may be extended to the axes limits by applying a polynomial curve fit the data. A second-order curve fit using $$F = aR^2 + bR + c$$

has generally been found to be adequate, although a higher order curve fit can be used if desired or needed in a particular case.

For input R and F values lying along the upper curve A, the output of the digital background compensator should be near maximum since these points correspond to the laser spot being entirely on the luminescent ink. For values lying along the lower curve E the output should be minimized since these points correspond to the laser spot being entirely on the background substrate. A normalized range of zero to one is used for simplicity.

The dashed lines B, C, and D between points show the R and F values corresponding to some point on the edge of a luminescent bar 1—1. For example, when the laser beam spot is half on and half off the luminescent bar, the R and F values should be at the center dashed line labeled curve C. The output of the digital background compensator 400 should be 0.5 for this case. By using simple bilinear interpolation, one may compute the R,F points corresponding to any output between 0 and 1. It has been found to be useful to compute these points for outputs of 0.25, 0.5 and 0.75. This has been done for the data plotted on FIG. 7 as shown in curves B, C, and D respectively.

One method to compute the output for any given R and F is to generate a surface above the R-F plane (from the digital background compensator output). Several methods for generating points on a surface at uniformly spaced "x" and "y" locations from random "x,y,z" data are well known; one method that seems to work well for these data is kriging. Thus a kriging algorithm well known in the art may be used for generating points from the measured data. The inputs to the kriging algorithm are the R,F points along the upper curve with a "z" value of one, the R,F points along the lower curve with a "z" value of zero, and the computed R,F points for outputs of 0.25, 0.5, and 0.75, as described above. The results of applying this algorithm are displayed in FIG. 8.

By selecting the spacing of the R and of the F points in the surface to correspond the respective ranges of the R and F analog to digital converters 90 in the digital background compensator 400, the output of the surface generation algorithm provides data for a look-up table to provide the desired normalized output for the given R and F input. Scaling may be applied to the normalized output to generate the desired output range in the look-up table.

In one typical embodiment, the calibration card 500 is preferably made of a substrate that is used at a particular site. For example a manufacturing plant or an association of users will have control over the paper stock that will be used and can thus optimize the cards for the particular paper stock, background and inks that will be encountered in use. The substrate or substrates used for the calibration cards 500 will then match the materials being read and will provide optimized reading situations.

For general use where the type of substrate material is unknown, it is possible to use a substrate having average properties when compared to the materials expected to be encountered. Alternatively, several types of substrates can be used for the cards and the data placed in the look-up tables. Then as bar coded material to be read is encountered the characteristics of the substrate ahead of the coded region can be used to select a closest fit to a particular type of substrate in the look-up table. Data from this look-up data is then used for obtaining the compensated output that is substantially free of bar code edge effects.

If desired a gray scale can be used in place of a step density wedge as described above. In a gray scale, instead of having a stepwise increase or decrease of light absorption as in FIGS. 5 and 6, there is a gradual decrease or increase of light absorption as one goes from one end of the card to the other. A gray scale is well known and is not pictured herein.

A further embodiment of the invention includes using a neural network. Neural network software can be used to more easily generate the look-up information discussed above. The look-up table generated by a neural network typically includes, typically in a single look-up table or alternatively if desired in only a few look-up tables, background compensating data sets from a multitude of parameters. As is the case with the other calibration scheme, hardware variables (e.g. such as gain, offset, DC restoration, low pass filter characteristics, and so on), which can vary from system to system, can also be included in these background compensated data sets; the look-up table can further include the additional calibration data for variations in substrate, background, inks, and so on. Background information can include gray scales, color scales, paper coatings (e.g. glossy, flat) and so on.

The creation of a single look-up table that incorporates variations (anticipated or from real-life production runs) in the apparatus as well as in the backgrounds can provide a more robust and complete compensation system. Apparatus variations can typically be incorporated from information generated by varying control functions of the apparatus such as sensitivity, frequency, and so on; from information generated in various production runs; or both. The neural network software is typically loaded into digital signal processor 450 or into an external CPU or personal computer.

Neural network development software packages, such as "Pattern Recognition Workbench" from Unica Technologies, Inc., Lincoln, Mass., U.S.A., are available off-the-shelf, and have the capability to accept calibration data sets of luminescent and reflected signals to create algorithms which can be used for the generation of compensation data for the look-up table.

RESULTS OF THE CALIBRATION

After the calibration has been performed, the function determined by the calibration is loaded into the memory 420.

Referring now to FIG. 9, this figure shows oscilloscope traces of the luminescent channel bar code signal A, the reflectance channel bar code signal B, and the resulting compensated bar code output signal C for a bar code printed partially on and partially off of the density step marked 20% in FIG. 6. The signal represented by trace C is compensated for reflectance, edge effects, crosstalk, and other distortions introduced by the reading system. This is achieved because preferably the calibration can be made using the reading system that will actually be used to read the bar codes. Any reading system produced distortions will be taken into account in the data stored in memory 420.

Referring now to FIG. 10, this figure shows oscilloscope traces of the luminescent channel bar code signal A, the reflected channel bar code signal B, and the resulting compensated bar code output signal C for a bar code printed partially on and partially off of the 70% density step (marked 70% in FIG. 6). The signal represented by trace C is compensated for reflectance, edge effects, crosstalk, etc.

Referring now to FIG. 11, this figure shows oscilloscope traces of the luminescent channel bar code signal A, the reflectance channel bar code signal B, and the resulting compensated output signal C for a bar code printed partially on and partially off of the 90% step (marked 90% in FIG. 6). This last example demonstrates that if the signal to noise ratio of the input signals is too low, as it is in this particular case, the compensated output bars will have a poor signal to noise ratio. In this latter case, the luminescent channel noise is seen at the compensated output. The signal to noise ratio can be improved over darker backgrounds by using a luminescent ink dye that offers greater luminescence efficiency, by increasing the laser power output, or by increasing the detector and electronics signal to noise ratio. The signal represented by trace C is compensated for reflectance, edge effects, crosstalk, etc.

Figure 12:
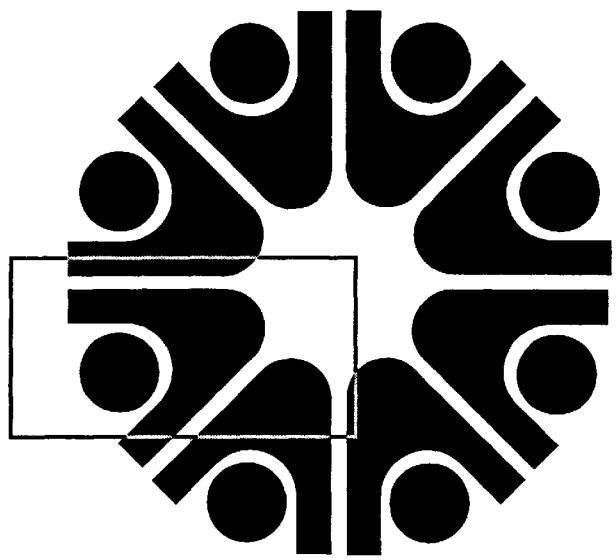
FIG. 12 shows a report cover having figures printed thereon over which luminescent bar codes are printed. The area in the rectangle is where the luminescent bar code was printed.

A picture, typically a magazine cover, over which transparent luminescent bar codes were printed is shown in FIG. 12. The luminescent bar code was printed within the area shown by the rectangle over the circular figure. Reading the bar code printed on FIG. 12 with the device disclosed herein resulted in data shown by oscilloscope traces in FIG. 13. FIG. 13 shows the resultant luminescence channel bar code signal 13 A, the reflectance channel bar code signal 13 B, and the resulting compensated bar code signal output C. The signal represented by trace C is compensated for reflectance, edge effects, crosstalk, etc.

While the forms of the invention herein disclosed constitute presently preferred embodiments, many others are possible. It is not intended herein to mention all of the possible equivalent forms or ramifications of the invention. It is to be understood that the terms used herein are merely descriptive, rather than limiting, and that various changes may be made without departing from the spirit or the scope of the invention.

We claim:

1. Apparatus for reading a luminescent bar code on a background surface whose reflectance may vary over the coded area, comprising:

a. means for providing light to scan, and to excite luminescence in said bar code and/or to reflect from said background surface of said coded area;

b. means responsive to reflected non-luminescent light for providing a first signal;

c. means responsive to luminescent light for providing a second signal;

d. memory means having stored calibration indicia of reflectance and luminescence, said memory means responsive to said first and second signals for providing a compensated output signal; and e. means for digital signal processing for providing calibration indicia for said memory means.

2. Apparatus according to claim 1, further comprising:

e. means for interfacing data having said calibration indicia with said memory means.

3. Apparatus according to claim 2, further comprising:
   e. means for digital signal processing for providing calibration indicia for said memory means, wherein signals to be processed are obtained through the scanning of calibration cards.

4. Apparatus according to claim 1, wherein said means for digital signal processing further comprises neural network software.

5. Apparatus for reading a luminescent bar code on a background surface whose reflectance may vary over the coded area, comprising:
   a. means for providing light to scan, and to excite luminescence in said bar code and/or to reflect from said background surface of said coded area;
   b. means responsive to reflected non-luminescent light for providing a first signal;
   c. means responsive to luminescent light for providing a second signal;
   d. memory means having stored calibration indicia of reflectance and luminescence, said memory means responsive to said first and second signals for providing a compensated output signal; and
   wherein said calibration indicia is stored in memory as one or more look-up tables.

6. Apparatus as in claim 5, comprising one or more look-up tables produced by a neural network.

7. Apparatus according to claim 5, wherein said stored calibration indicia of reflectance and luminescence comprises a look-up table configured to obtain a preselected signal of bar code edge information.

8. Apparatus according to claim 5, wherein said means for providing said first, second and output signals comprise digital means.

9. Apparatus according to claim 5, wherein said first, second and output signals are optical or electrical signals.

10. Apparatus according to claim 5, wherein said means for providing said first and second signals comprise means for separating said light into a first wavelength band corresponding to non-luminescent light and a second wavelength band corresponding to said luminescence, and optical means for collecting and focusing light in each wavelength band on separate means for providing separate output signals responsive to said light in each wavelength band.

11. Apparatus according to claim 10, wherein said light separating means comprises light filters.

12. Apparatus according to claim 11, wherein said light separating means comprises a dichroic beam splitter.

13. Apparatus according to claim 5, wherein said means for providing light to excite luminescence in said bar code comprises an ultraviolet light source that is activated briefly prior to scanning said bar code to provide phosphorescence in the material of the bars, and said means for providing light that is reflected without luminescence from said background surface during scanning of said bar code comprises a light source providing light of wavelength in the range of about 600 to 900 nanometers.

14. Apparatus according to claim 5, wherein said light providing means comprises laser means for providing light in the near infrared region that excites a dye in said bar code to fluoresce in a band of wavelengths in the infrared region longer than the wavelength of said excitation light.

15. Apparatus according to claim 5, wherein the same light excites said luminescence and provides said non-luminescent light that is reflected from the background surface.

16. Apparatus for reading a luminescent bar code on a background surface whose reflectance may vary over the coded area, comprising:
   a. means for providing light to scan, and to excite luminescence in said bar code and/or to reflect from said background surface of said coded area;
   b. means responsive to reflected non-luminescent light for providing a first signal;
   c. means responsive to luminescent light for providing a second signal;
   d. memory means having stored calibration indicia of reflectance and luminescence, said memory means responsive to said first and second signals for providing a compensated output signal; and
   wherein said output signal is substantially compensated for background reflectance and/or substantially free of bar code edge distortion.

17. Apparatus according to claim 16, wherein said means for providing said first and second electrical signals comprise photodetecting means.

18. A calibration card for use with luminescent bar code readers comprising:
   a. a substrate;
   b. a grey scale applied to a portion of said substrate, wherein said grey scale has increasing or decreasing light absorption characteristics from one end of said gray scale to the other; and
   c. a luminescent material applied to a portion of said substrate and to a portion of said grey scale at a plurality of areas of gradually increasing or decreasing light absorption.

19. A calibration card for use with luminescent bar code readers comprising: a step density card comprising,
   a. a substrate;
   b. a density wedge applied to said substrate, said density wedge comprising a plurality of light absorbing backgrounds on said substrate wherein each of said light absorbing backgrounds comprises a light absorbing material applied to said substrate, wherein said light absorbing backgrounds are placed substantially adjacent to one another and have a graduated increase in light absorption from one light absorbing background to another;
   c. at least one luminescent area on a portion of said substrate and at least one luminescent area on a portion of each of said light absorbing backgrounds, wherein said luminescent area comprises a luminescent material applied to said substrate or said light absorbing material.

20. The step density card according to claim 19, wherein said luminescent area comprises a luminescent bar code.

21. The step density card according to claim 20, wherein said luminescent bar code has substantially the same characteristics as a luminescent bar code to be read by apparatus for reading bar codes with which said step density card is used.

22. The step density card according to claim 19, wherein said luminescent bar code is partially on said light absorbing background and partially on said substrate.

23. A method for reading a luminescent bar code on a background surface and correcting background reflectance to obtain a signal substantially free of bar code edge signal distortion, comprising:
   a. providing a beam of light containing at least one predominant frequency band,
   b. scanning said beam across said bar code,
   c. selectively collecting reflected non-luminescent light in a first frequency band, d. selectively collecting light in a second frequency band predominantly resulting from luminescence of said bar code, e. converting said collected light in said first frequency band into a first signal responsive to the reflectance of the background surface, f. converting said collected light in the second frequency band into a second signal responsive to the amount of luminescent light, g. providing a compensated output signal corresponding to said first and second signals from a look-up table in memory.

24. A method according to claim 23, wherein said luminescent bar code contains dyes that luminesce in the far red and near infrared region and said light is provided by laser means that simultaneously stimulates luminescence while scanning said bar code to provide reflected light without luminescence responsive to the reflectance of the background surface.

25. A method according to claim 24, wherein said luminescent bar code is substantially transparent and is applied over a visible bar code, and both bar codes are read using the same light source and using separate signal processing means for each bar code.

26. A method according to claim 23, comprising scanning one ore more calibration cards with an apparatus for reading bar codes said apparatus having memory means for storing and accessing a look-up table, converting obtained signals into digital signals, processing said signals to provide calibration indicia for said memory means.

27. A method according to claim 26, comprising obtaining an output signal substantially independent of background reflectance, and substantially free of bar code edge distortion and reader system induced distortion.

28. Apparatus for reading a luminescent bar code on a background surface whose reflectance may vary over the coded area, comprising:

a. light source apparatus to scan, and to excite luminescence in said bar code or to reflect from said background surface of said coded area;

b. non-luminescent light detector apparatus responsive to non-luminescent light for providing a first signal;

c. luminescent light detector apparatus responsive to luminescent light for providing a second signal;

d. random access memory apparatus having stored calibration indicia of reflectance and luminescence, said memory means responsive to said first and second signals for providing a compensated output signal.

29. Apparatus according to claim 28, further comprising:
e. electronic interface circuitry interfacing said calibration indicia with said memory means.

30. Apparatus according to claim 28, further comprising:
e. digital signal processor for providing calibration indicia for said memory means.

31. Apparatus according to claim 30, further comprising:
e. digital signal processor that provides calibration indicia for said memory means, wherein signals to be processed are obtained through the scanning of calibration cards with said apparatus.

32. Apparatus according to claim 28, wherein a look-up table is configured in said random access memory to obtain a linearized signal of bar code edge information.

33. Apparatus according to claim 28 wherein calibration indicia is stored in random access memory as a look-up table, said first and second signals are used to access said look-up table, said random access memory providing an output signal in response to said first and second signals.

34. Apparatus according to claim 28, wherein a look-up table in random access memory is configured from a neural network to provide signal compensation data for a multitude of bar code, substrate, background, and/or apparatus variations.

35. Apparatus according to claim 28, wherein said first, second and output signals are optical or electrical signals.

36. Apparatus according to claim 28, wherein said output signal is substantially compensated for background reflectance and/or substantially free of bar code edge distortion.

37. Apparatus according to claim 30, wherein said digital signal processor is loaded with neural network software.

* * * * *

UNITED STATES PATENT AND TRADEMARK OFFICE
CERTIFICATE OF CORRECTION

Figure 9A:
FIG. 9 shows oscilloscope traces of the luminescent channel bar code signal A, the reflectance channel bar code signal B, and the resulting compensated bar code output signal C for the luminescent bar code printed partially on and partially off of the step marked 20% in FIG. 6.
Figure 9B:
Figure 9C:
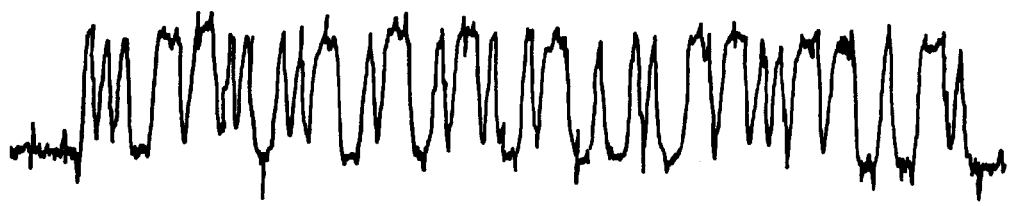

PATENT NO. : 6,119,071
DATED : September 12, 2000
INVENTOR(S) : Ronald L. Gorenflo, Thomas M. Dolash, and John J. Garvey It is certified that error appears in the above—identified patent and that said Letters Patent is hereby corrected as shown below:

Column 6, line 36, "FIG. 9 shows" should be -- FIGS. 9A, 9B, and 9C show --

Column 6, line 39, "signal C" should be -- signal C, respectively, --

Figure 10A:
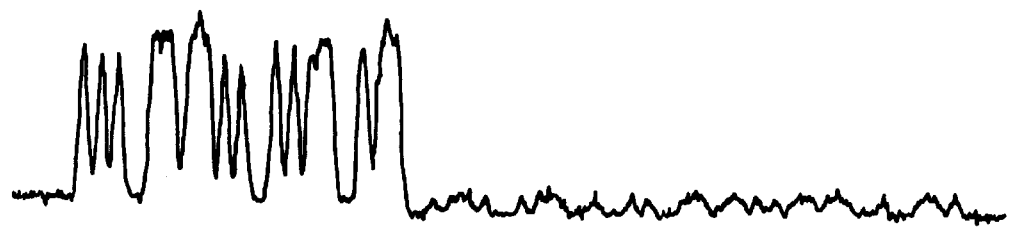
FIG. 10 shows oscilloscope traces of the luminescent channel bar code signal A, the reflected channel bar code signal B, and the resulting compensated bar code output signal C for the luminescent bar code printed partially on and partially off of the 70% step (marked 70% in FIG. 6).
Figure 10B:
Figure 10C:
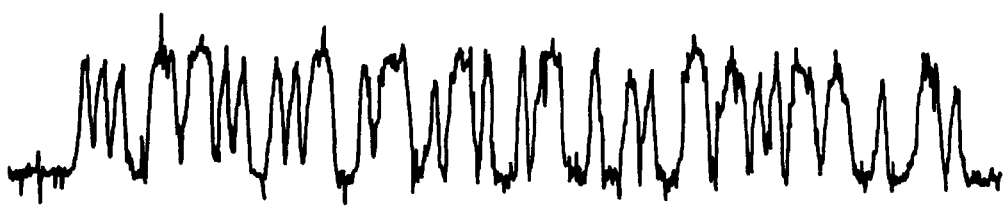

Column 6, line 41, "FIG. 10 shows" should be -- FIGS. 10A, 10B, and 10C show --

Column 6, line 44, "signal C" should be -- signal C, respectively, --

Figure 11A:
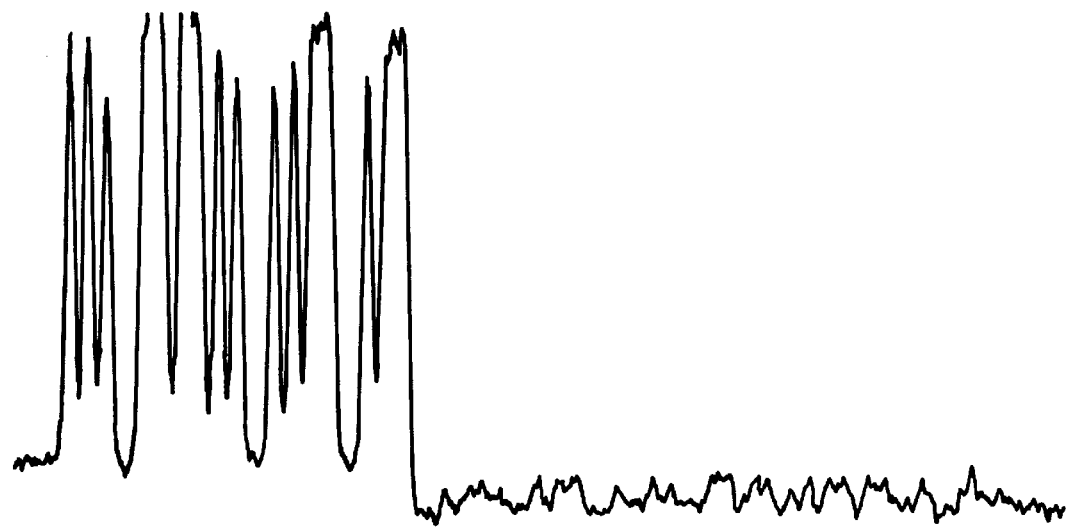
FIG. 11 shows oscilloscope traces of the luminescent channel bar code signal A, the reflectance channel bar code signal B, and the resulting compensated output signal C for the luminescent bar code printed partially on and partially off of the 90% step (marked 90% in FIG. 6).
Figure 11B:
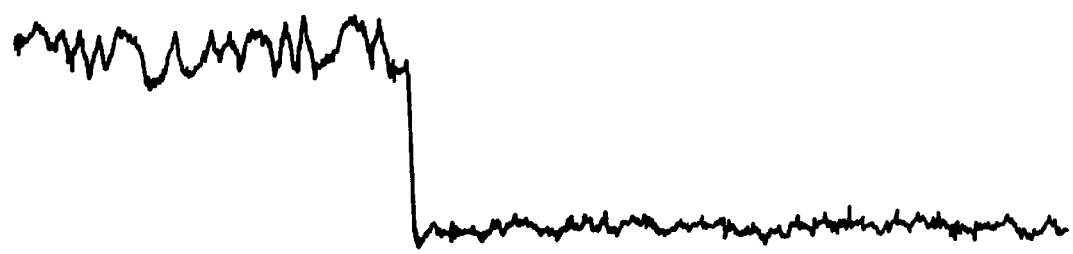
Figure 11C:
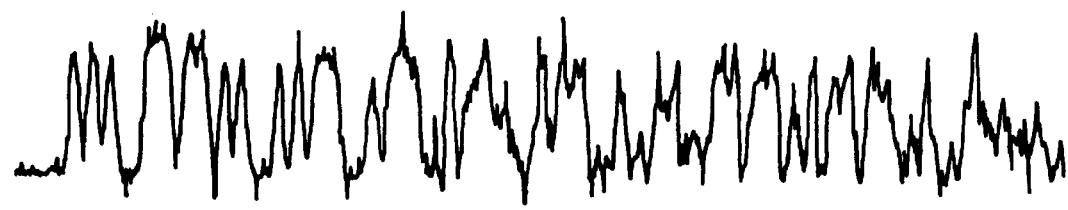

Column 6, line 46, "FIG. 11 shows" should be -- FIGS. 11A, 11B, 11C show --

Column 6, line 48, "signal C" should be -- signal C, respectively, --

Figure 13A:
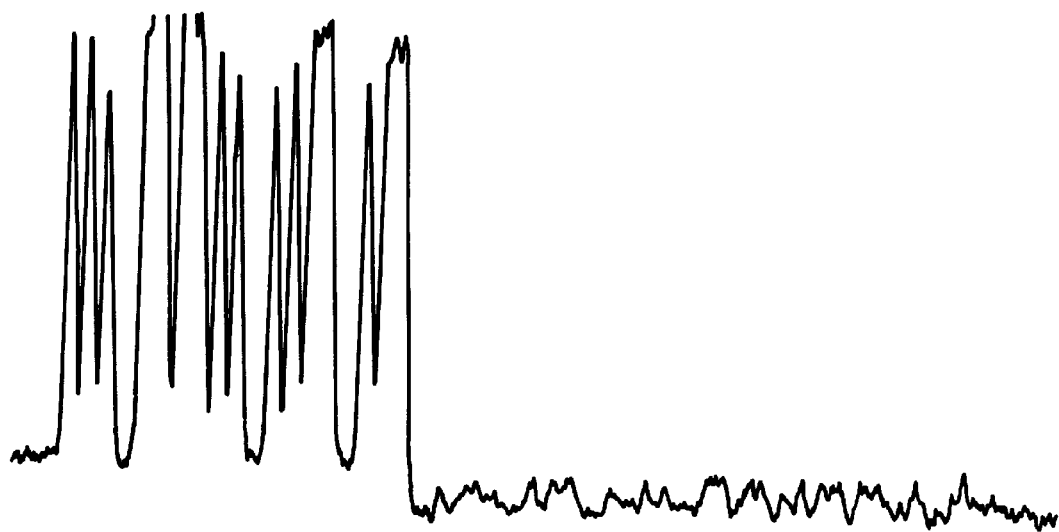
FIG. 13 shows oscilloscope traces of the luminescent channel bar code signal A, the reflectance channel bar code signal B, and the resulting compensated output signal C for the luminescent bar code printed over the picture of FIG. 12.
Figure 13B:
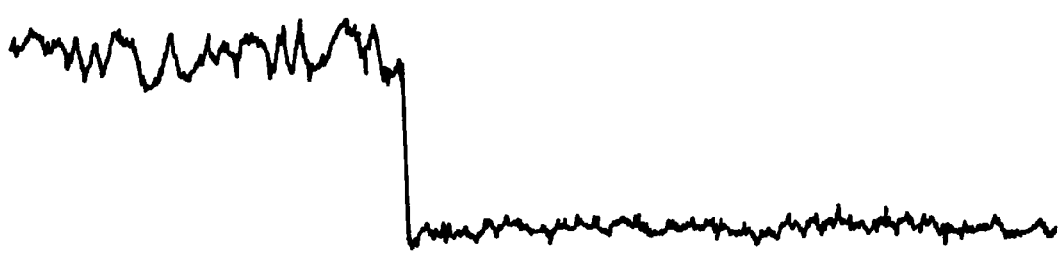
Figure 13C:
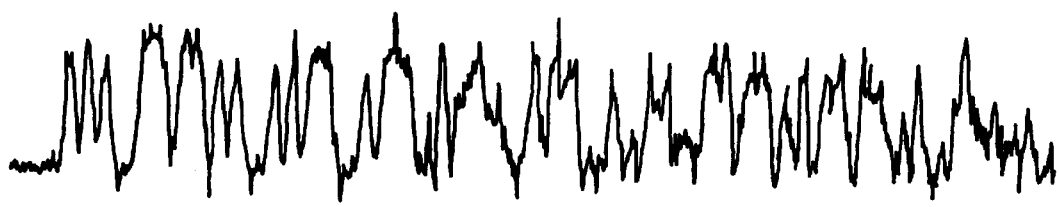

Column 6, line 56, "FIG. 13 shows" should be -- FIGS. 13A, 13B, and 13C show --

Column 6, line 58, "signal C" should be -- signal C, respectively, --

Column 13, line 58, "FIG. 9, this figure shows" should be -- FIGS. 9A, 9B, and 9C, these figures show --

Column 13, line 61, "signal C" should be -- signal C, respectively, --

Column 14, line 3, "FIG. 10, this figure shows" should be -- FIGS. 10A, 10B, and 10C, these figures show --

UNITED STATES PATENT AND TRADEMARK OFFICE
CERTIFICATE OF CORRECTION

PATENT NO. : 6,119,071
DATED : September 12, 2000
INVENTOR(S) : Ronald L. Gorenflo, Thomas M. Dolash, and John J. Garvey It is certified that error appears in the above—identified patent and that said Letters Patent is hereby corrected as shown below:

Column 14, line 6, "signal C" should be -- signal C, respectively, --

Column 14, line 11, "FIG. 11, this figure shows" should be -- FIGS. 11A, 11B, and 11C, these figures show --

Column 14, line 14, "signal C" should be -- signal C, respectively, --

Column 14, lines 32 and 33, "FIG. 13. FIG. 13 shows" should be -- FIGS. 13A, 13B, and 13C that show --

Column 14, line 35, "signal output C" should be -- signal output C, respectively --

Signed and Sealed this

First Day of May, 2001

*Attest:*

NICHOLAS P. GODICI

*Attesting Officer*     *Acting Director of the United States Patent and Trademark Office*